United States Patent
Yonkers

[15] 3,692,921
[45] Sept. 19, 1972

[54] CABLE COUPLER
[72] Inventor: Edward H. Yonkers, Wilmette, Ill.
[73] Assignee: Joslyn Mfg. and Supply Co., Chicago, Ill.
[22] Filed: April 12, 1971
[21] Appl. No.: 133,005

[52] U.S. Cl. ............ 174/72 R, 174/73 R, 174/77 R, 174/88 S, 317/114, 337/168, 337/186, 337/241, 339/36, 339/60 R, 339/94 R, 339/143 C, 339/242
[51] Int. Cl. ..................... H01r 13/00, H02q 15/00
[58] Field of Search ....... 174/71 R, 72 R, 73 R, 75 R, 174/75 D, 77 R, 80, 84 S, 88 S, 93; 307/147; 339/36, 60 R, 61 R, 94 R, 116 R, 116 C, 143 R, 143 C, 149 R, 150 R, 150 C, 242, 263 R, 268 R

[56] References Cited
UNITED STATES PATENTS

| | | | |
|---|---|---|---|
| 2,087,384 | 7/1937 | Lee | 174/72 R |
| 2,403,642 | 7/1946 | Draxler | 174/72 R UX |
| 2,785,319 | 3/1957 | Simpson et al. | 174/71 R UX |
| 2,967,901 | 1/1961 | Priaroggia | 174/73 R |
| 3,183,476 | 5/1965 | Sacks et al. | 174/72 R UX |
| 3,350,677 | 10/1967 | Daum | 174/72 R UX |
| 3,517,113 | 6/1970 | Ono et al. | 174/73 R X |
| 3,590,138 | 6/1971 | Sugimoto et al. | 174/72 R |
| 3,595,984 | 7/1971 | Tachik | 174/72 R |

Primary Examiner—Laramie E. Askin
Attorney—Mason, Kolehmainen, Rathburn & Wyss

[57] ABSTRACT

There is provided an improved high voltage cable coupler having a body of integrally cast dielectric polymer chemically formed in situ and having at least one cable receiving channel therethrough. An internal conductor is cast within the body extending within the cable receiving channel to receive the end of a cable. The cable receiving channel is symmetrical, and a cable may be inserted in one end, secured through the other, and the other end then plugged. A soft polymer sealing sleeve advantageously provides air-free interfaces between the cable and the walls of the cable channel, and between the plug and the wall of the cable channel. In a desired embodiment, the soft polymer sealing sleeve is thicker in wall section than the space between the cable and channel so as to form an interference fit between the cable and channel, and between the plug and cable channel wall, so as to resiliently load the soft polymer. At all times, the inner end of the soft polymer is free to move axially into a shielded space, thus permitting a limited range of cable diameters to be used with a given sealing sleeve, and a wide range of cable diameters can be accommodated by employing sealing sleeves of various appropriate wall thickness.

5 Claims, 20 Drawing Figures

PATENTED SEP 19 1972 3,692,921

INVENTOR
EDWARD H. YONKERS

BY Mason, Kolehmainen,
Rathburn & Wyss

ATTORNEYS

INVENTOR
EDWARD H. YONKERS

BY Mason, Kolehmainen, Rathburn & Wyss
ATTORNEYS

CABLE COUPLER

The present invention relates to a cable tap coupler, and more particularly, to an improved cable tap coupler for joining, branching and terminating high voltage electric power cable.

The continued rapid growth in the use of electrical energy leads to the necessity for higher voltages in electrical distribution systems, and particularly for the electrical distribution systems in highrise buildings, factories, and the like. For example, over the past 20 years, distribution voltages within buildings have advanced from a five KV zone to a range of 12 to 15 KV, and present trends point to the 24 and 33 KV distribution areas. At the same time, the growing requirements for underground distribution of electricity, particularly in urban areas, has brought about fast improvements in and extensive use of polymer insulated distribution cable.

The present invention provides new and improved means for conveniently and securely joining, branching and terminating such distribution cables. The great need for improved means for utilizing distribution cable is clear when one considers the use of the usual "pot head" and hand taped, joined and branched techniques in terms of a modern, all-electrical highrise building or a large industrial plant where the electrical energy requirements are so high that the distribution within the building or plant requires 12 to 15 KV to avoid excessive conductor cross section. Both high rise buildings and industrial plants today require sectionalizing and branching at frequent intervals, and often require alternate feed systems in order to avoid long power outages. One three-phase alternate feed branch could require as many as 18 of the usual cable terminals. Furthermore, all open terminals and branch switching points must be housed within a grounded surface for safety reasons.

Accordingly, it is the object of the present invention to provide a new and improved cable tap coupler.

Another object of the present invention is the provision of a new and improved system for accomplishing the functions of joining, branching and terminating electrical distribution cables.

Yet another object of the present invention is the provision of the means for joining, branching and terminating electrical distribution cables quickly without the use of highly specialized skilled labor.

Still another object of the present invention is the provision of means for accomplishing the functions of joining, branching and terminating electrical distribution cables with a high degree of circuit integrity and safety.

Further objects of the present invention will become apparent as the following discription proceeds and the features of novelty which characterize the invention will be pointed out with particularlity in the claims annexed to and forming a part of this specification.

In accordance with the present invention there is provided an improved high voltage cable tap coupler for branching, terminating and coupling high voltage cable and including a body of integrally formed dielectric, including a symmetrically formed cable channel extending therethrough. The cable tap coupler includes a low resistance grounding surface covering on its body. An internal conductive shunt is cast within the body extending symmetrically within the cable channel and having an aperture therethrough aligned with the axis of the channel for receiving a cable end means. Thus, a cable end may be inserted in one end of the cable channel, and secured through the other open end thereof. This other end then may be plugged to seal the cable channel. In accordance with one feature of the present invention the body of the cable tap coupler is formed of integrally cast hard dielectric polymer formed in situ so as to provide a void-free homogeneous dielectric material without folds or weak regions. The polyurethanes represent one suitable class of materials.

In accordance with another feature of the present invention there is provided a soft polymer sealing sleeve in each end of the cable channel, so that the cable may be inserted within one end, and a dielectric plug may be inserted within the other end to form a sealed connection between the cable and the internal conductor. The wall of the soft polymer sealing sleeve is greater in radial thickness then the clearance between the cable insulation and the wall of the cable channel, and between the plug and the wall of the cable channel, so as to provide an interference fit and require elongation of the soft polymer upon insertion of the cable end or plug. Advantageously, the coefficient of expansion of the soft polymer sealing sleeve, the cable insulation or plug, and hard polymer forming the body of the cable tap coupler are nearly the same so that the sleeve remains in void-free engagement during thermal changes of the cable tap coupler; and the initial elongation of the sealing sleeve permits a limited range of cable diameters to be used with a given sealing sleeve. A wide range of cable diameters can be accommodated by using sealing sleeves of various appropriate wall thicknesses.

For a better understanding of the present invention reference may be had to the accompanying drawing wherein:

FIG. 20 illustrates a top view of a cable tap coupler as would be required in a high rise building distribution system or the like.

Figure 1:
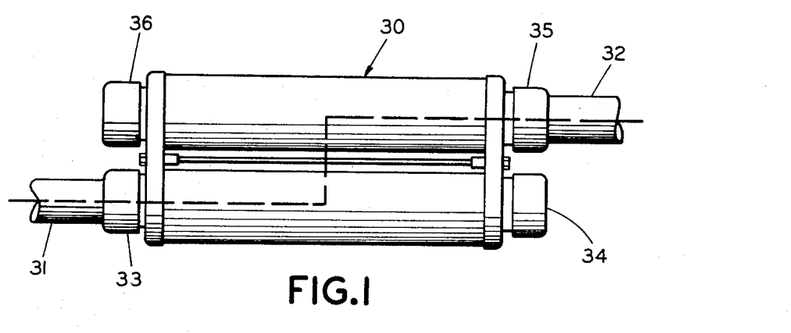
FIG. 1 is a somewhat schematic view illustrating the simplest form of invention known as the type C coupler, functioning as a cable coupling or joint in accordance with the present invention.
Figure 2:
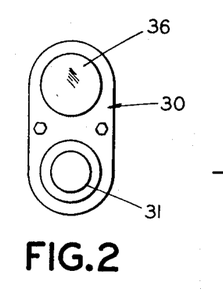
FIG. 2 is an end view of the cable tap coupler of FIG. 1.

Referring now to the drawings and particularly to the FIGS. 1 and 2, there is illustrated the simplest form of the cable tap coupler system representative of the present invention and illustrating a type C-Coupler 30 functioning as a cable coupler or joint connecting the ends of cables 31 and 32. More specifically, the cable ends having been first prepared in a manner hereinafter described, and referring to cable 31, the end thereof is inserted into the grounded surface insulated housing of the cable tap coupler 30 through a sealed entrance 33. The cable end 31 is bolted to an inner conductor through an opening 34 aligned with the sealed entrance 33. After the cable 31 has been bolted in place, a dielectric plug is inserted in the opening 34 to re-establish seal. The end of the second cable 32 is inserted into a sealed entrance 35 and similarly bolted to the inner conductor through the aligned opening 36 which is also then sealed by means of a dielectric plug as in the case of opening 34. The cable tap coupler 30 is symmetrical so that the cables 31 and 32 may extend out of either end of the respective cable channels, and the opposite end thereof being plugged. The electrical circuit in the illustrated embodiment is shown in FIG. 1 by the heavy broken line.

Figure 3:
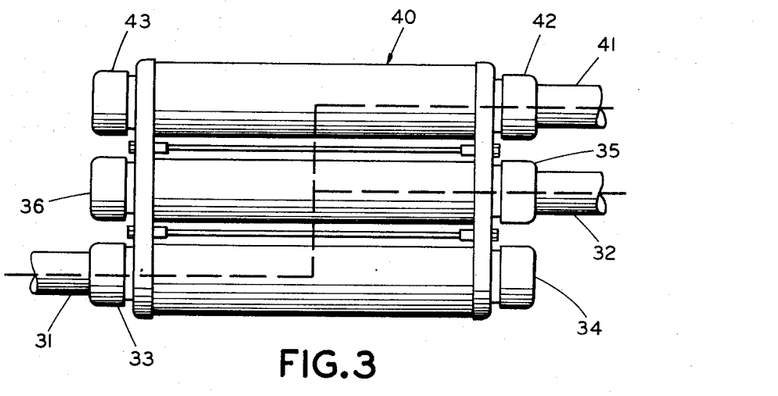
FIG. 3 is a somewhat schematic view of the invention illustrating a type BC-branch coupler in accordance with the present invention.
Figure 4:
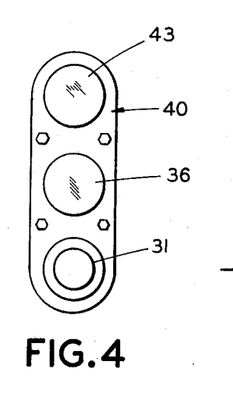
FIG. 4 is an end view of the cable tap coupler of FIG. 3.

Referring now to FIGS. 3 and 4, the same procedure is followed as with FIGS. 1 and 2, except that the cable tap coupler is illustrated with the more complex type BC-form 40 providing means by which a third cable may be joined to the first two cable ends. More specifically, the cable connector 40 connects the cables 31 and 32 in like manner as heretofore described, cable 31 passing through the opening 33 and then secured through the opening 34, cable 32 passing through opening 35 and secured through 36. A third cable 41 passes through a sealed entrance 42 and is secured through an opening 43 which is similarly plugged by a suitable dielectric plug. It will be observed that the type-BC cable tap coupler is symmetrical so that the cables 31, 32 and 41 may extend out of either end of the respective cable channels. Thus, the branch circuit 41 may extend to the right, as shown in FIG. 3, or to the left. The electrical circuit is illustrated by the heavy broken line in FIG. 3.

Figure 5:
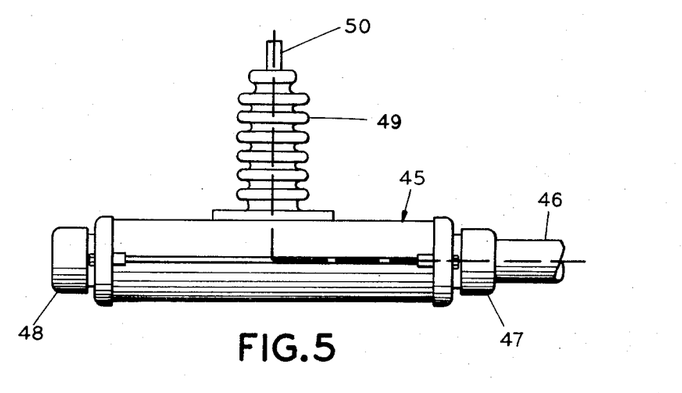
FIG. 5 is a somewhat schematic view of the coupler according to the present invention wherein one cable is terminated within a grounded surface housing and connected to an air insulated terminal, referred to as type AT-terminal.
Figure 6:
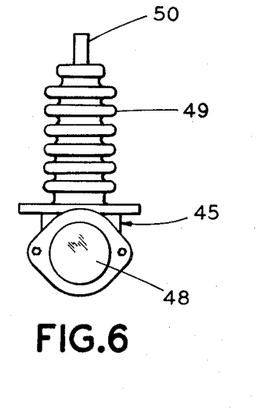
FIG. 6 is an end view of the cable connector of FIG. 5.

FIGS. 5 and 6 illustrate a cable coupler 45 of the type AT-air terminal wherein a suitable distribution cable 46 extends into a cable channel through a sealed entrance 47 and is secured to an inner conductor through an aligned opening 48 in the grounded surface of the cable tap coupler 45. A suitable dielectric plug closes the opening 48 to establish the integrity of the cable tap coupler. The inner connector of the cable tap coupler 45 is carried to the outside of the housing through an extended surface dielectric bushing 49 forming an air insulated terminal 50. The electrical path is illustrated by the heavy broken line in FIG. 5.

Figures 7, 8:
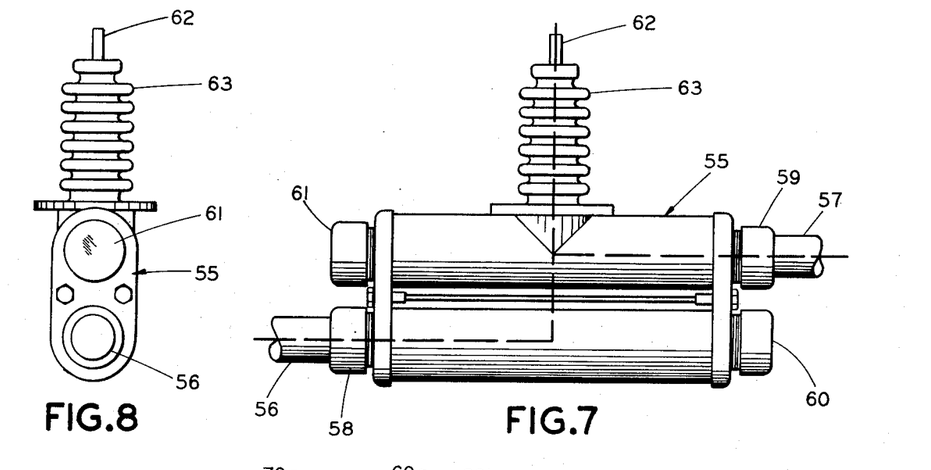
FIG. 7 is a somewhat schematic view of yet another form of the invention wherein 2 cables are joined within the cable tap coupler housing and an air insulated branch terminal is provided, generally referred to as type ATC-Air Terminal Coupler.
FIG. 8 is an end view of the cable tap coupler of FIG. 7.

FIGS. 7 and 8 illustrate a type ATC air terminal coupler 55, wherein two cable ends 56 and 57 extend through sealed entrances 58 and 59, of respective cable channels, and are secured through aligned openings 60 and 61 to an internal conductor in a manner heretofore described. The internal conductor is connected to an air insulated terminal 62 extending through an extended surface dielectric air bushing 63.

The grounded housing of the cable tap couplers 45 and 55, with the air insulated terminals 50 and 62, advantageously permit mounting for attachment directly to switch gear frames, switch enclosures and the like. The versatility of the system is inherent by the fact that all sealed entrances and aligned openings are exactly the same geometry so that cable entrances or access openings of the cable channels are all interchangeable, cables extending either to the left or right as viewed in FIGS. 1, 3, 5 and 7.

Figures 9, 10, 11, 12, 13:
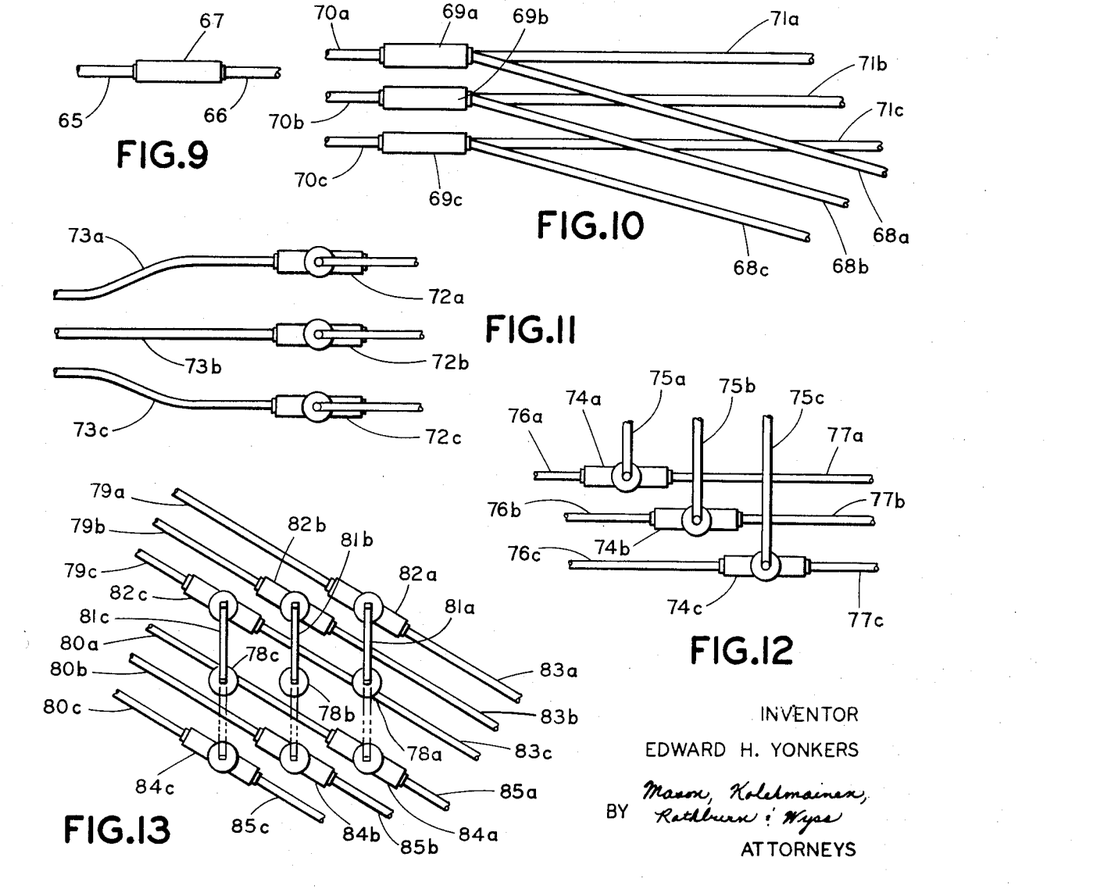
FIG. 9 is a schematic representation of a cable connector using the type-C connector of FIGS. 1 and 2.
FIG. 10 is a schematic representation of a three-phase branch circuit, using type BC connectors of FIGS. 3 and 4.
FIG. 11 is a schematic representation of a 3 phase cable to air termination using the type AT connector of FIGS. 5 and 6.
FIG. 12 is a schematic representation of a 3 phase cable air tap or branch using the ATC connectors of FIGS. 7 and 8.
FIG. 13 is a schematic representation of a three-phase alternate feed cable air switch in accordance with the present invention.

FIGS. 9 through 13 schematically illustrate various layouts for cable tap coupler system applications of various forms of the invention. For example, the type C coupler forms a simple cable coupler or joint as illustrated in FIG. 9. A pair of cables 65, 66 have their ends electrically connected through a type C cable tap coupler 67.

FIG. 10 illustrates the use of a type BC cable tap coupler applied to a three-phase branch system. As therein illustrated a three-phase tap 68a, 68b, 68c extends from type BC cable tap couplers 69a, 69b, 69c which also couple the three-phase line 70a, 70b, 70c to a three-phase line 71a, 71b, 71c.

As illustrated in FIG. 11 the type AT cable connectors 72a, 72b, 72c are illustrated providing a three-phase cable line 73a, 73b, 73c cable, to air terminals for connection to suitable switch gear or other equipment, not shown.

FIG. 12 illustrates the type ATC cable tap coupler 74a, 74b, 74c providing an air tap 75a, 75b, 75c to a three-phase line 76a, 76b, 76c and 77a, 77b, 77c.

Referring now to FIG. 13 there is illustrated a three-phase alternate feed air switch including a set of three-phase branch terminals 78a, 78b, 78c which may be selectively connected to a first set of feed lines 79a, 79b, 79c or a second set of feed lines 80a, 80b, 80c by means of suitable switch blades 81a, 81b, 81c. The first set of feed lines 79a, 79b, 79c connect through suitable type ATC cable tap coupler 82a, 82b, 82c to lines 83a, 83b, 83c. The second set of feed lines 80a, 80b, 80c connect through suitable ATC type cable tap couplers 84a, 84b, 84c to feed lines 85a, 85b, 85c. The switch blade 81a, 81b, 81c will selectively connect the tap terminals 78a, 78b, 78c with the air terminals of the first set of cable tap couplers 82a, 82b, 82c as illustrated in solid in FIG. 13, or to the second set of cable tap couplers 84a, 84b, 84c as illustrated in phantom in FIG. 13.

Figures 14, 15:
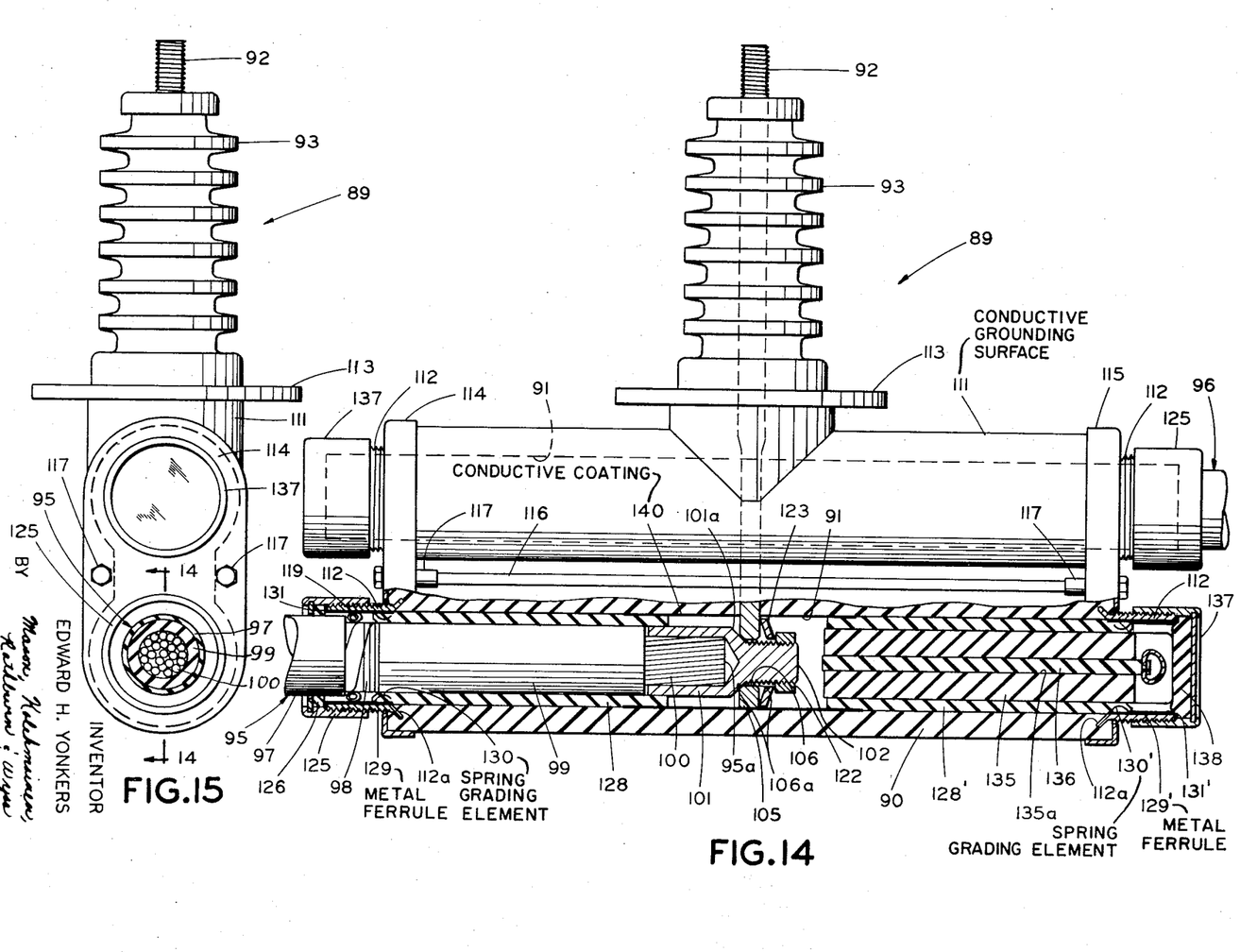
FIG. 14 is a cutaway view of a typical cable tap connector, here shown as the type ATC form of FIGS. 7 and 8, in accordance with the present invention.
FIG. 15 is an end view of the connector of FIG. 14.

A typical cable tap coupler is illustrated in FIGS. 14 and 15. As therein illustrated the cable tap coupler is of the ACT type shown in FIGS. 7 and 8 wherein 2 cables are joined or coupled with an air terminal tap. This form of cable tap coupler is illustrated as typical of the other forms, for example, the type C, BC, and type AT, and similar components of the ATC air terminal coupler will be identical with those of the other types. FIG. 14 illustrates in broken away section through the axis of one of the cable channels a typical cable attachment to the cable tap coupler, and is taken substantially along the vertical plane 14—14 of FIG. 15.

As therein illustrated there is shown a cable connector 89 having a body 90 of a dielectric material. It has been found that an integrally cast dielectric polymer formed in situ possesses the desirable mechanical and electrical properties such that there are no discontinuities, folds or voids in the polymer which would give rise to electrical weakness, and is tough and rigid to support mechanical couplings. The dielectric body 90 is formed with a pair of through cable channels 91, only one of which is illustrated in broken away section in FIG. 14, and an exposed air terminal 92 extending through an extended surface dielectric bushing 93.

The cable tap coupler is here illustrated as applied to a solid dielectric grounded sheath type of electrical power cable 95, 96 but the cable tap coupler is equally applicable to concentric neutral type cables with the addition of connection means for its neutral wires. Each of the cables 95, 96 has been prepared and secured within the cable tap coupler 89 in a similar manner and accordingly, only the preparation and insulation of the cable 95 is herein described as typical. Referring now to the cable 95, the cable has been prepared by removing an outer jacket 97 a prescribed distance from the end 95a thereof so that a desired amount of a conductive wound taped shield 98 is exposed. Cable insulation 99 is exposed beyond the shield 98 a predetermined distance exposing a central conductor 100 of the cable 95. A compression connector 101 is secured over the end of the central conductor 100 in any suitable manner, such as by crimping. The compression connector 101 is provided with a threaded end 102.

To provide for the electrical path between the various cables and terminals of the couplers, there is provided an internal conductor 105 extending from the air terminal 92 through the cable connector 89 and into the respective cable channels 91. Within the cable channels 91 the internal conductor 105 is provided with a suitable aperture 106 for receiving the threaded end 102 of the compression connector 101. The edges of the aperture 106 are beveled or chamfered, such as at 106a, to mate with a complementary taper 101a on the compression conductor 101 providing good electrical and mechanical connection between the compression connector 101 and the inner conductor 105.

The cable tap coupler 89 is symmetrical as to its left and right sides with the internal conductor 105 centrally positioned within the channels 91 so that the cables 95 and 96 may be inserted and assembled from either side of the respective cable channels 91.

The cable tap coupler 89 is cast with the dielectric body 90 and is provided with a low resistance grounded housing surface 111 of stainless steel or other suitable conducting material. Metal inserts 112 are (molded or) cast within the dielectric body 90 concentric with each end of the cable channels 91 and from an extension of the cable channels. The grounded surface 111 contains a central opening, defining a metal flange 113 which contains suitable threaded bolt holes for mounting the unit onto switch frames or other suitable structure to the grounded surfaces of such housings for various applications. The exterior metal housing is firmly held together by means of end covers 114, 115 and tension rods 116 and nuts 117. The internal conductor 105 is cast in place with the dielectric body 90 securing the same in void-free contact therewith. Suitable circular garter spring connectors 119 provide a good conductive path from the taped shield 98 of the cable 95 to the ground through the adjacent metal insert 112.

To provide for electrically insulating and sealing the cable channels 91, there is provided a pair of soft polymer sealing sleeves 128, 128' each formed with a metal ferrule 129, 129' and a spring grading element 130, 130' embedded in the polymer. An outer flange 131, 131' formed on the metal ferrule 129, 129' engages the end of the threaded insert 112 at its outer edge thereby positioning the respective sealing sleeves 128, 128' within the ends of the cable channels 91.

Prior to assembly of the cable 95 into the cable channel 91 a cap 125 having a sealing gasket 126 is slipped over the outer cable jacket 97. The spring connector 119 is also slipped over the cable end so as to engage the grounding tap shield 98. The cable is then inserted into the desired end of the cable channel 91 through the soft polymer sealing sleeve 128. The radial thickness of the sealing sleeve 128 is greater than the clearance between the cable insulation 99 and the inner surface of the cable channel 91 so that the sleeve 128 will elongate axially away from the restrained end as the cable is forced into the opening, thus subjecting the sleeve 128 to a compression and thereby wiping the interfaces between the cable insulation 99 and the soft polymer sleeve, and between the soft polymer sleeve and the inner surface of the cable channel 91 completely free of air, and providing an air free interface between these surfaces. Sufficient open space is provided beyond the ends of the polymer sleeve 128 and the internal conductor 105 to permit a considerable range of cable insulation outer diameters to be received so that a limited range of types and sizes of cables may be employed with a particular sleeve and a wide range of cable sizes can be accommodated with several sleeve sizes. The connector 101 has its threaded portion 102 inserted through the aperture 106 in the internal conductor 105 and is bolted firmly in place by means of a nut 122 and a Belleville spring washer 123. The nut 122 may be tightened with a socket wrench through the opposite or open end of the cable channel 91. The cap 125 may then be tightened to provide a permanent seal against air and moisture without the use of mechanical spring means since the elastic stress in the polymer 128 is sufficient to maintain the necessary void-free interfaces. Moreover, because the thermal coefficient of expansion of the polymer sleeve 128, the cable insulation 99, and the dielectric body 90 are very nearly the same, they will not be subjected to alternate relative expansion and contraction due to thermal changes in the cable tap coupler 89. The interfaces of the associated members including the cable insulation 99, the polymer sealing sleeve 128 and the dielectric body 90 are coated with silicone grease before assembly in order to reduce friction and to assure the gas free interfacial engagement therebetween.

The same sealing system generally is employed at the free or open end of the cable channel 91. More specifically, a dielectric plug 135 is provided having an outer diameter slightly greater than the inner diameter of the sleeve 128' in like manner as the cable insulation 99 so as to elongate the soft polymer along the axial direction away from the retaining flange 131', thereby permitting the oversized plug to enter the sleeve. Thus, the sleeve 128' is pre-stressed progressively along its axial length to expel air between the interfaces between the dielectric plug 135 and sleeve 128', and between the sleeve 128' and dielectric body 90. There is provided a completely air free interfacial engagement between the components. The necessary volumetric change in the sealing sleeve 128' takes place in like manner as with the sealing sleeve 128 by the extension of the outer end of the sleeve 128 into the space adjacent the internal shunt 105. An air vent rod 136 is then inserted into an air vent opening 135a extending axially through the dielectric plug 135. A sealing cap 137 and sealing gasket 138 are then threaded onto the metal insert 112 and the opening to the cable channel 91 is closed.

The interfaces of the associated members including the dielectric body 90, the sealing sleeve 128', the dielectric plug 135 and the air vent plug 136 are coated with silicone grease before assembly in order to reduce friction and assure gas free interfacial engagement. The air vent rod 136 is inserted after the plug 135 is in place so as to minimize the volume of entrapped air within the cable channel 91.

The described system becomes a permanent seal against air and moisture infiltration without the use of additional spring members to spring load the polymer sleeves because of the elastic strain on the polymer sleeves 128, 128', and further because the thermal coefficient of expansion between the polymer sleeves 128, 128', the dielectric body 90, and the cable insulation 99 or dielectric plug 135 are very nearly the same.

In order to prevent electrostatic field effects in the air space within the cable channels 91 around the internal conductor 105, a conductive coating 140 is employed on the dielectric body surface and connected to the internal conductor 105. The outer edges of the conductive lining 140 extend into the air free interfacial zones between the sealing sleeves 128, 128', and the dielectric body 90 where the maximum potential gradient occurs. Potential gradients occuring within the air spaces are thus reduced to insignificant levels. The potential gradients are reduced in the air excluded regions at the outer ends of the openings by means of conical geometry of the inner ends of the metal inserts 112, as shown at 112a, and by the ferrule 129, 129'.

Both of the end openings of the cable channels 91 providing for cable entrances or access holes are geometrically and electrically the same, so that the sealing sleeves 128, 128', plugs 135, and caps 125, 137 are interchangeable both as between the ends of the cable channel and as between cable channels of a cable tap coupler. This versatility is important in many applications.

The air terminal 92 is an extension of the internal conductor 105 and the air insulator or dielectric bushing 93 is an extension of the integral dielectric casting forming the dielectric body 90 so that there is no discontinuity or interfacial seal in the dielectric envelope over the high potential conductive elements of the cable and the associated conductor. The dielectric bushing 93 is to have sufficient geometric extension to provide adequate space and leakage surface for the intended voltage.

All external surfaces of the integral dielectric casting or body 90 excepting the extended surface dielectric bushing 93 are coated with a conductive material, locked gas free into the surface of the dielectric body 90. This removes the necessity for the metal grounded surface 111 to fit the dielectric exterior in void-free relation. Small area contacts between the grounded surface 111 and the dielectric body 90 without the conductive surface could cause destructive corona and radio interference from such causes.

The strong metal flange 113 provides for mounting the unit on switch frames or through the surface of grounded housings for various applications. The exterior metal housing is firmly held together by means of the end covers 114, 115 and the tension rods and nuts 116, 117. The mechanical integrity of the system is sufficiently strong so that the air terminal 92 can be connected to fittings suitable for forming receivers or switch blades, fuse clips and the like.

Figure 16:
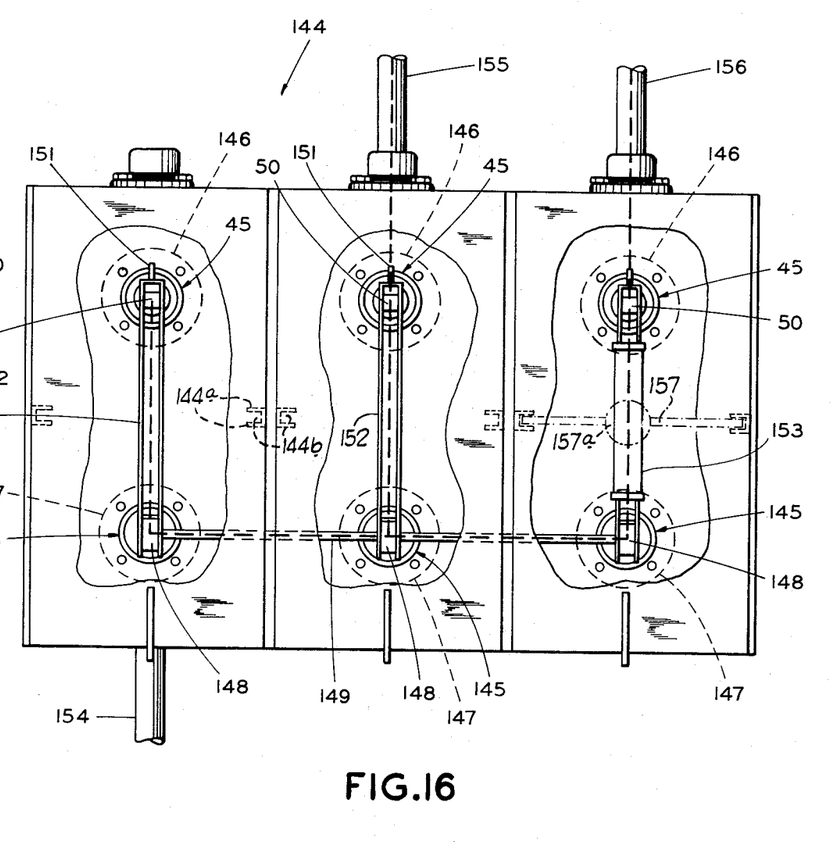
FIG. 16 is a plan view of a cable tap connector system illustrating the application of the invention which provides the functions of a cable sectionalizing and fused tap or branch circuit as required in a high rise building distribution system.
Figure 17:
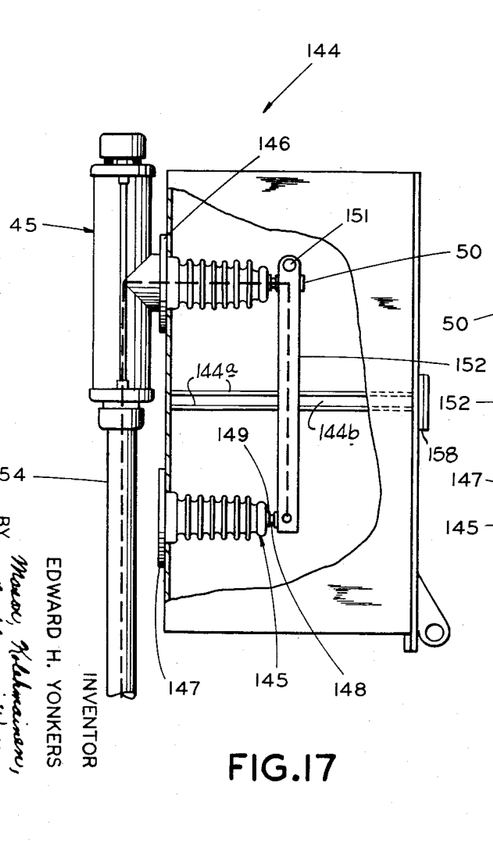
FIG. 17 is a side view of the system of FIG. 16.

FIGS. 16 and 17 illustrate the type AT couplers 45 illustrated in FIGS. 5 and 6, and forming disconnecting switches and fuse disconnects in a switching center 144, suitable for use in a highrise building 15 KV distribution system and the like. Accordingly, the same reference numerals will be used in FIGS. 16 and 17 to identify identical parts with the embodiment of FIGS. 5 and 6. The switch housing 144 includes 3 AT type cable tap couplers 45, and three associated stand-off insulated terminals 145, all mounted to the switch center 144 through flanges 146 on the cable tap couplers 45 and flanges 147 on the stand-off insulator terminals 145. The stand-off insulator terminals 145 have projecting air terminals 148 interconnected by a suitable buss 149. The air terminal 50 on the cable tap coupler 45 serves to directly mount the hinge 151 of a switch blade 152 or to directly receive a fuse 153. Thus, there is provided from a supply line 154 a switched line 155 and a fused tap 156.

Advantageously, there may be provided an isolating barrier, shown in phantom at 157 in FIG. 16, and insertable between the terminals 50 and 148 when the switch blade 152 is open or removed. The barrier may have a colored sight indicator 157a visible through a window or sight glass 158, FIG. 17, formed in the cover of the housing 144. The barrier 157 may be slid into place between a pair of opposed grooves 144b formed by pairs of ribs 144a in each compartment of the housing. Thus, a serviceman can readily observe by sight whether a particular circuit has been electrically isolated.

Figure 18:
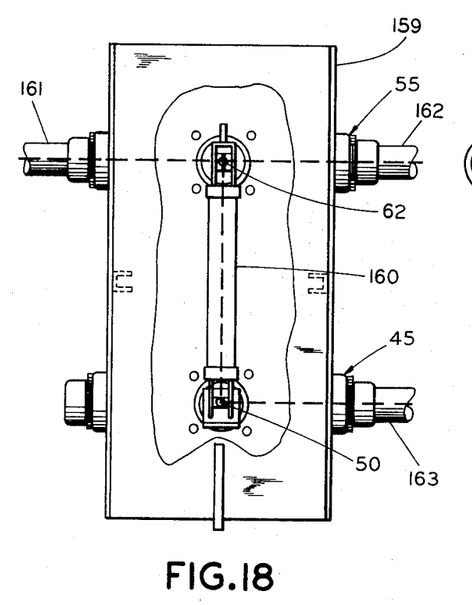
FIG. 18 is a front view of the system of FIG. 17.
Figure 19:
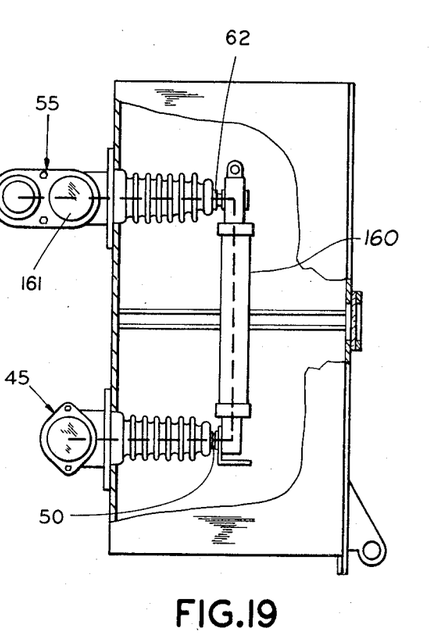
FIG. 19 is a side view of the system of FIG. 20.
Figure 20:
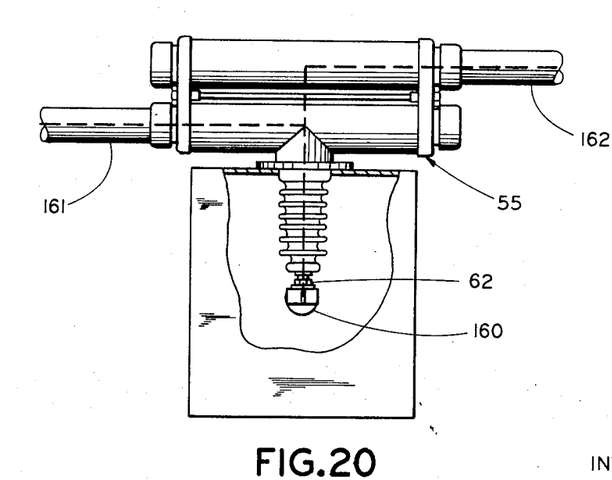

FIGS. 18, 19, and 20 illustrate a typical fused tap from a through line and illustrates a type ATC coupler tap connector 55, similar to the cable tap coupler 55 illustrated in FIGS. 7 and 8, and an AT type cable tap coupler 45 similar to the cable tap coupler described in FIGS. 5 and 6. More specifically, the cable tap couplers 45 and 55 are secured directly to the bottom of a fuse box 159, with their air terminals 62, 50 opening into the interior of the box. A suitable fuse 160 is mounted directly between the air terminals 62 and 50. A supply line 161, 162 extends through the cable tap coupler 55, and a tap 163 extends from the cable tap coupler 45. The heavy phantom lines represent the paths of current flow.

Advantageously the air terminal embodiments provide for an air bushing having a strong mounting flange and, when installed in a service box, the inner air bushing is isolated from the externally accessible cable coupling or receiving portion. Moreover, the coupler is reusable; the same or another cable may be repeated, removed or reassembled with the cable coupler.

Although the present invention has been described by reference to several embodiments thereof, it will be apparent that numerous other modifications and embodiments will be devised by those skilled in the art which will fall within the true spirit and scope of the present invention.

What is claimed as new and desired to be secured by Letters Patent of the United States is:

1. A device for coupling a high voltage cable with associated apparatus comprising:
   a body of integrally formed dielectric material having a channel extending therethrough,
   a low-resistance grounding surface covering a major portion of said body,
   first means within said channel conductively receiving an end of said cable,
   second means within a first end of said channel receiving and maintaining in a void-free interfacial relationship an insulated portion of said cable,
   dielectric means for closing and sealing a second end of said channel,
   third means within said second end of said channel receiving and maintaining in a void-free interfacial relationship said dielectric means and
   a bushing extending outwardly from said device through said grounding surface, formed by a portion of said body of integrally formed dielectric material and including fourth means conductively connected to said first means for electrically connecting said cable to said associated apparatus.

2. A device as recited in claim 1 wherein said second and third means comprise soft dielectric sealing sleeves elongated axially and circumferentially distorted and stressed upon the receipt of said insulated portion of said cable and said dielectric means, respectively, to maintain said insulated portion of said cable and said dielectric means in said void-free interfacial relationships within said channel.

3. A device as recited in claim 1 wherein said dielectric means comprises a dielectric plug having a longitudinally extending air vent and means for sealing said air vent.

4. A device as recited in claim 1 further comprising conductive means affixed to a portion of that part of said body forming said channel, conductively connected to said first means for reducing the electrical stress on the air trapped within said channel.

5. A device for terminating the end of a high voltage cable comprising
   a body of dielectric material,
   a channel extending through at least a portion of said body,
   means within said channel receiving and maintaining in a void-free interfacial relationship an insulated portion of said cable, said means comprising a soft dielectric sealing sleeve elongated axially and circumferentially distorted and stressed upon the receipt of said insulated portion of said cable to maintain said insulated portion of said cable in said void-free interfacial relationship within said channel, and
   means holding one end of said sleeve in place within said channel.

* * * * *